Aug. 20, 1957 G. J. DURNDELL 2,803,238
MEANS FOR FORMING GRINDING WHEELS
Filed May 10, 1955 3 Sheets-Sheet 1
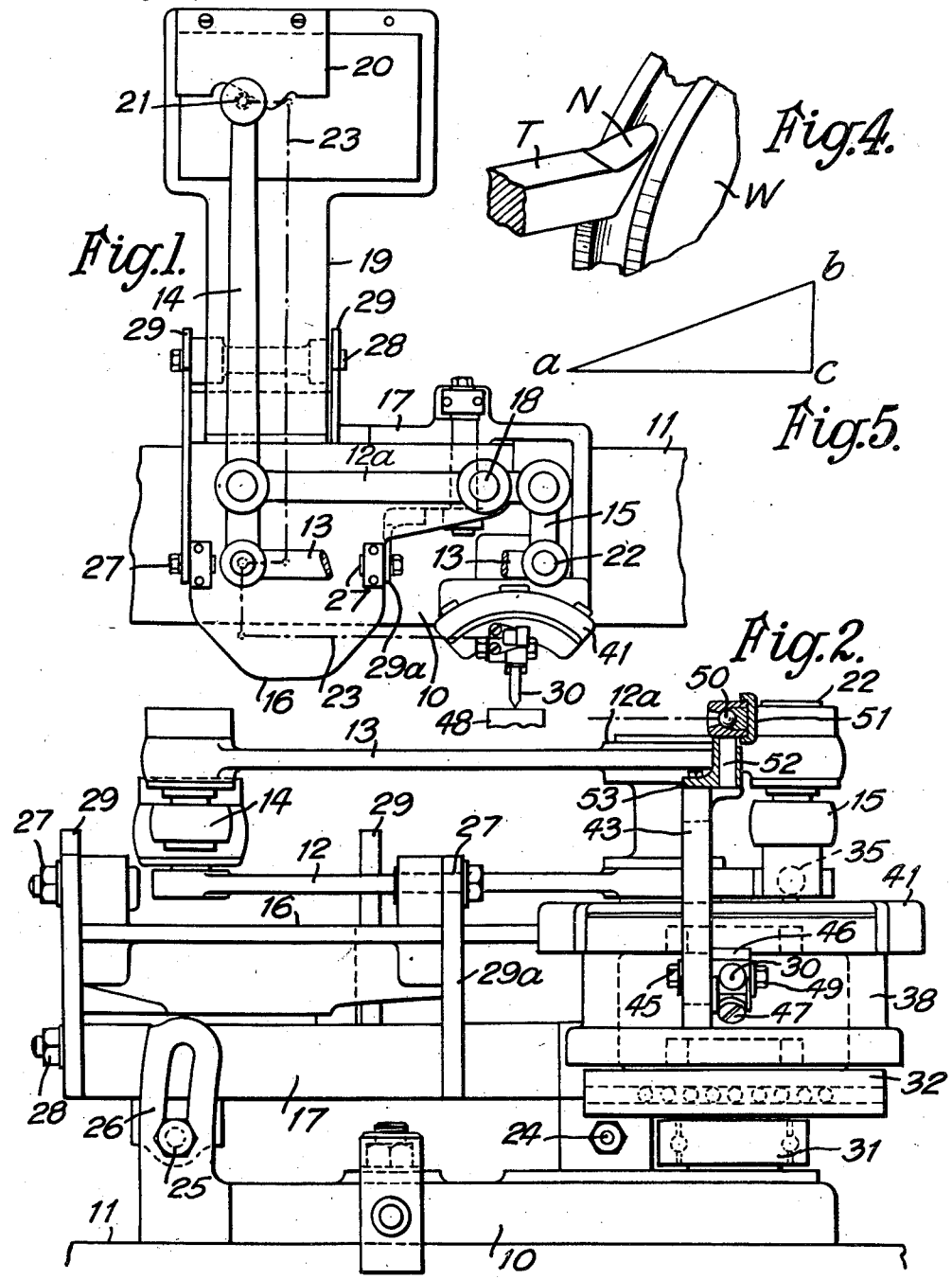
INVENTOR
George J. Durndell
By Shoemaker & Mattare
ATTORNEYS

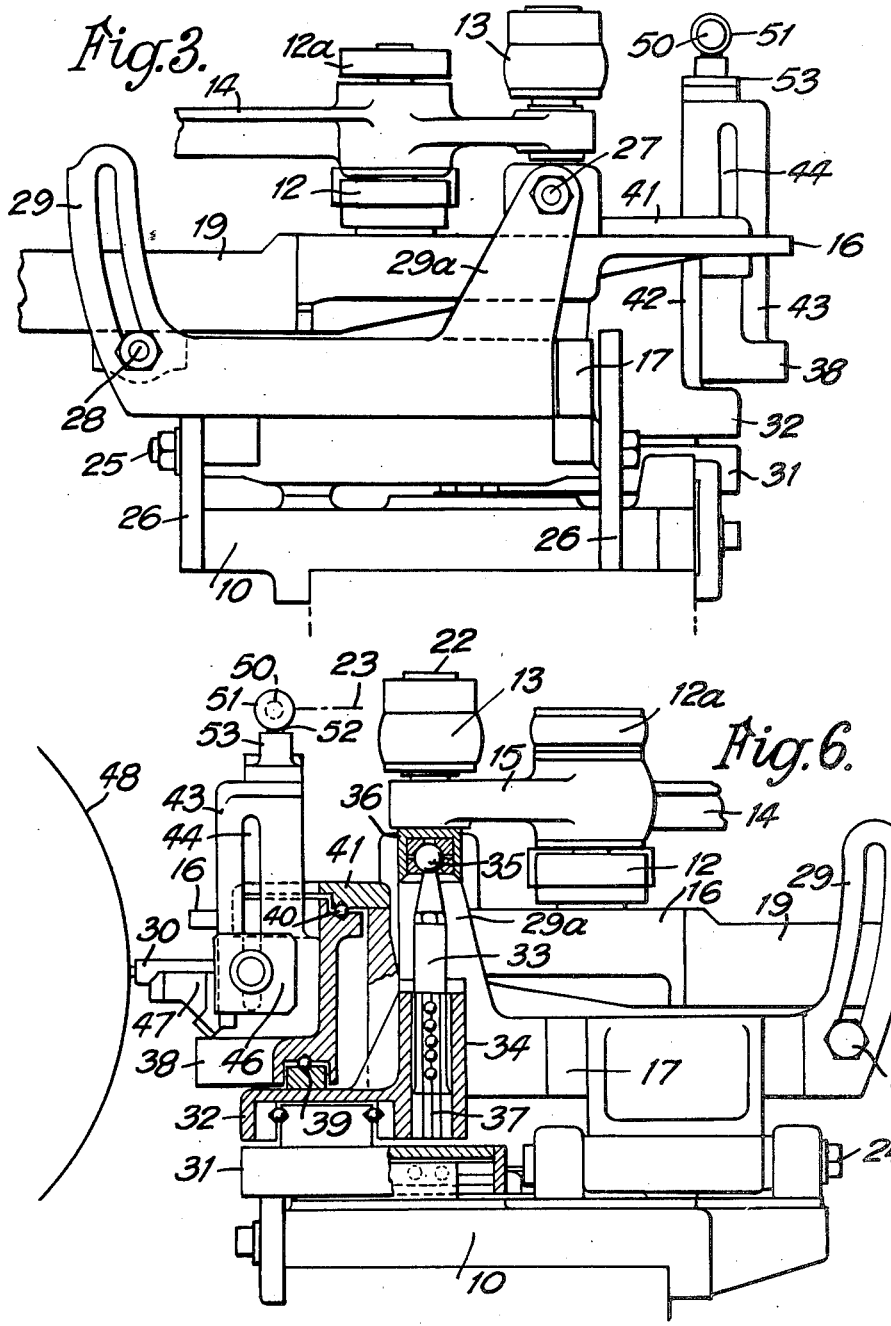

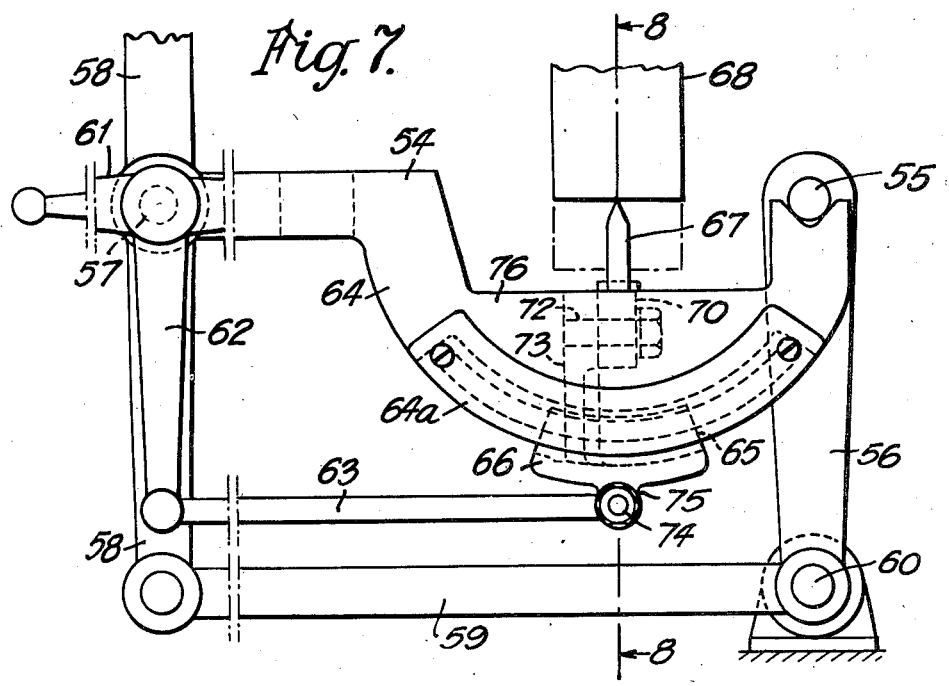

United States Patent Office 2,803,238
Patented Aug. 20, 1957

2,803,238

MEANS FOR FORMING GRINDING WHEELS

George Jasper Durndell, Ruislip, England

Application May 10, 1955, Serial No. 507,398

11 Claims. (Cl. 125—11)

This invention relates to means for forming grinding wheels and like rotatable objects, for the purpose of shaping the wheel by cutting it with a diamond or other tool in order to generate a desired profile, the formed wheel being then capable of use for grinding work-pieces to a shape which is the converse or complement of the profile of the wheel.

The preliminary formation of the wheel and its trueing up after use are commonly effected by cutting the rotating wheel with a tool operated by means of a hand-controlled pantograph mechanism, which causes the tool to copy on a reduced scale the movement of a stylus or tracer guided by hand along the edge of a template representing an enlarged version of the desired profile. Wheel-dressing or forming means of this character are well known in the art, and I have described an improvement in such forming means in my United States Patent No. 2,691,975, issued October 19, 1954.

One object of the present invention is to overcome the limitation of the diameter of the grinding wheel which can be cut with the dressing device, due to the danger of interference between the wheel and the bearings or other supports for the rocking tool-holder or carriage.

Another object of the invention is to provide a wheel-dressing device for use on cylindrical or surface grinding machines for cutting the grinding wheel to a profile which is a distortion of the profile on the template, for the purpose of producing a lathe tool, milling cutter or the like, with the top rake, side rake or side and top rake necessary for cutting the correct profile upon the work to be milled or turned.

A specific object of the invention is to provide a pantograph-controlled wheel-dressing device of this character with which a template profile may be reproduced upon the wheel with distortion in two planes, without the necessity of tilting the template relative to the plane of motion of the pantograph mechanism, in order to produce a wheel for grinding a work-piece such as a lathe tool having both top rake and side rake.

Other objects and advantages of the invention will hereinafter appear from the following description, given with reference to the accompanying drawings, in which:

Fig. 1 is a plan view of the pantograph-controlled wheel forming or dressing means, in one embodiment of the invention, some of the parts being broken away and the pantograph linkage represented diagrammatically.

Fig. 2 is a partial elevation on a larger scale, as seen from the bottom of Fig. 1.

Fig. 3 is a partial side view, also on a larger scale, as seen from the left of Fig. 1.

Fig. 4 shows a lathe tool in engagement with a grooved wheel.

Fig. 5 is a diagram.

Fig. 6 is a partial side view, as seen from the right of Fig. 1, with the dressing-tool mounting in part section.

Figs. 7 and 8 relate to a second embodiment of the invention, as applied to wheel-forming means such as described in my aforesaid Patent No. 2,691,975.

Fig. 7 is a partial elevation of the pantograph mechanism, showing the tool-carriage mounted upon the main lever arm, and Fig. 8 is a cross-section on the line 8—8 of Fig. 7.

Referring to Fig. 1, the wheel-forming means comprises a base-plate 10 which may be mounted upon the bed 11 of a grinding machine such as a cylindrical or surface grinding machine. A pantograph mechanism of conventional design, with two parallel lever arms 12, 13, of which the arm 12 may be duplicated at 12a, and two parallel links 14, 15, is supported upon the base-plate 10 by means of a table 16 and a sub-frame 17, the table 16 having the fixed pivot 18 of the pantograph secured thereto. An extension 19 of the table supports the template 20, which acts as guide for the stylus 21 carried by the long link 14 of the pantograph, bodily movement of the stylus being transmitted through the pantograph mechanism with a corresponding reduction to the pivot 22. Rocking movement of the stylus is transmitted by conventional linkage 23 (represented in chain lines) which controls the wheel-dressing tool. The link 14 may be forked as described in my aforesaid patent, for the purpose of isolating the stylus bearings during the manual manipulation.

As best seen in Fig. 2, the sub-frame 17 is hingedly connected to the base-plate 10 at 24, so that it may be raised together with the table 16 to an angle above the horizontal, for example up to 10 degrees, being then locked in this inclined position by means of a bolt 25 working in slotted guides 26. Similarly the table 16 is connected to the sub-frame 17 at a hinge 27, at right angles to the hinge 24, so that it may be raised together with the extension 19 and template 20 to an angle above the horizontal, for example up to 30 degrees, being then locked in this inclined position by means of a bolt 28 working in slotted guides 29 secured to the sub-frame 17, the bolt 28 being fitted below the extension 19, as seen in Fig. 3. The slotted guide 29 on one side of the table may be made integral with an arm 29a supporting the hinge 27 on that side of the table, another hinge-supporting arm 29a being provided on the other side of the table, and all these parts being secured to the sub-frame 17 by conventional means. The table 16 and the sub-frame 17 may be raised simultaneously, if desired, to any inclinations within their respective limits. The pantograph mechanism, including the template carried by the extension 19, will partake of the inclination given to the table 16, whether alone or as the result of the inclination of the sub-frame 17, or compounded as the result of their simultaneous movements about the respective hinges.

Fig. 4 illustrates a lathe tool T with a rounded nose N for cutting a semi-circular groove in the work-piece; if this tool has a top rake angle of 10 degrees, for example, the rounded top face will be semi-elliptical instead of semi-circular at the cutting edge, and the grooved wheel W for grinding this edge must have a correspondingly distorted profile. Moreover, if the tool has a front clearance or relief angle of 15 degrees, for example, the grinding wheel, to which the front face of the tool is tangential during the shaping or forming operation, must have its groove profile further distorted. Similar considerations apply to lathe tools for other than semi-circular work, and to milling cutters.

Fig. 5 illustrates diagrammatically how the required distortion of the profile can be obtained by reducing the movement of the dressing tool according to the inclination of the pantograph, the right-angled triangle $a$, $b$, $c$ having an angle $a$ equal to the assumed pantograph inclination. The hypotenuse $ab$ represents a distance moved by the pantograph pivot 22, and the horizontal line $ac$ represents a distance to be moved by the dressing tool parallel to the base-plate 10, while the third side bc of the triangle represents a vertical distance which has to be accommodated between the pantograph pivot 22 and the dressing-tool.

By adjustment of the table, pantograph and template to a desired inclination about the hinge 27, it is possible to produce a distortion of a profile copied from the template for the purpose of forming the grinding wheel to a profile suitable for grinding a work-piece such as a lathe-tool with the necessary top-rake for cutting the correct template profile upon work to be turned with the tool; similarly by adjustment of the sub-frame, table, pantograph and template to a desired inclination about the hinge 24, it is possible to produce a distortion of a profile copied from the template for the purpose of grinding a lathe-tool with the necessary side-rake for cutting the correct profile upon work to be turned with the tool. Combined adjustment about both hinges 24 and 27 will produce a profile modified in both senses, so that the tool can be ground with the appropriate profile for top-rake and side-rake.

It will be noted that the template 20 does not have to be tilted upon its support 19 relative to a reference surface, as usually provided in hand-operated pantographs, for example in the U. S. Patent No. 2,038,455, Studer, but remains fixed in relation to the table 16 which supports the pantograph mechanism; consequently, the stylus 21 remains always in proper contact with the edge of the template and does not have to be made of greater length to allow for the difference between its plane of movemen and the plane of the template, as happens when these two planes become angularly inclined to one another due to tilting of the template.

Bodily movement of the pantograph pivot 22 caused by travel of the stylus along the edge of the template is transmitted to the wheel-dressing tool 30 by means which will automatically convert the pantograph movement in its own plane when inclined to the base-plate 10, as by tilting about the hinge 27, into a movement in a plane parallel to the base-plate, with the necessary reduction according to the angle at which the pantograph has been inclined, whether in one or in two senses.

The transmission of the bodily movement of the pantograph pivot 22 takes places through two horizontal slides 31, 32, arranged as shown in Figs. 2 and 6 to move at right angles to one another in a plane or planes parallel to the base-plate 10 or to the bed of the grinding machine, and a coupling member 33 slidable in relation to a slideway 34 secured to or integral with the upper slide 32, the movement of the coupling member being perpendicular to the direction of movement of said slides. Thus, if the pantograph and template are tilted to an angle $a$ relative to the horizontal, while the two slides 31, 32 are movable in the horizontal plane and the slideway 34 stands up vertically upon the upper slide 32, with the coupling member 33 slidable vertically in the slideway bodily movement imparted by the pantograph to the upper end of the coupling member can be resolved into two components at right angles, corresponding to the sides $bc$ and $ac$ of the triangle in Fig. 5. The vertical components, equal to $\sin a$, will merely cause the coupling member 33 to rise or fall in the slideway 34 by a distance corresponding to the side $bc$, and the horizontal component, equal to $\cos a$, will move the upper and/or lower slides 31, 32 parallel to the base-plate 10 through a distance which will correspond to the side $ac$, this latter distance representing the distorted or shortened form of the template profile to be imparted to the grinding wheel.

As shown in Fig. 6, the slideway 34 consists of a cylinder integral with the upper slide 32, and the coupling member 33 consists of a rod having a ball-head 35 which engages in a spherical socket 36 secured beneath the short link 15 of the pantograph in axial alignment with the pivot 22; the lower end of the rod or coupling member 33 has a pair of longitudinal grooves or races fitted with rows of balls 37 engaging also in similar grooves or races on the interior of the cylinder or slideway 34, so as to reduce frictional resistance to sliding movement of the coupling member. In the normal position of the parts, with the pantograph lying horizontal and the links 14, 15 at right angles to the arms 12, 13, the centre of the ball-head 35 is in horizontal alignment with the axis of the hinge 27, so that the raising of the pantograph to an inclined position by tilting it about that hinge will have an effect upon the coupling member 33, but bodily movement of the stylus bringing the pantograph to an angled position will cause the ball-head 35 to swing with the pivot 22, the slideway or cylinder 34 then transmitting corresponding movements to the horizontal slides 31, 32, reduced according to the cosine of the angle of inclination of the pantograph.

Rocking movement of the stylus 21, transmitted through the linkage 23, will also be imparted to the tool 30, which is mounted for rocking movement about an axis tangential to the periphery of the grinding wheel at the actual cutting point, this axis passing through the centre of the radiused tip of the tool. For this purpose, there is mounted upon the upper horizontal slide 32, adjacent to the slideway or cylinder 34, a carriage in the form of an arcuate slide 38 supported on ball-races 39, 40 concentric with the tool-tip, the lower race 39 being secured on the top of the slide 32 below the level of the tool 30, and the upper race 40 being formed by a coverplate 41 secured above the level of the tool 30 upon an arcuate wall 42 extending beside the slideway 34; the length of the two races 39, 40 and their vertical spacing are such as to provide proper support for the carriage or slide 38 to take the radial and axial thrusts exerted upon the tool. From the concave face of the slide 38 there projects a vertical lug 43 having a slot 44 in which there is fitted a bolt 45 carrying a block 46 of square shape, forming a rotatable turret to which the shank of the tool 30 is clamped by a tool-holder 47; provision may be made for securing two dressing tools on adjacent faces of the block 46 for alternative use, the bolt 45 forming a pivot on which the turret can be turned to bring either tool into the operative position relative to the grinding wheel 48, the axis of which is parallel to that of the turret. The bolt 45 can be shifted along the slot 44 for adjusting the height of the tool, its position being then locked by tightening the nut 49 which at the same time fixes the turret in the selected position. The carriage or arcuate slide 38 carrying the cutting tool is mounted for oscillation within a slideway of similar shape formed by the arcuate wall 42, the slide 38 turning upon the ball-races 39, 40, so as to rock the dressing tool 30 in unison with the stylus 21, and movement being transmitted for this purpose by the linkage 23. This linkage is connected by a ball-joint 50 to a block 51 having a vertical peg 52 engaged in a socket 53 upon the upper end of the lug 43; inclination of the pantograph mechanism and table 16, with or without the sub-frame 17, about one or both of the hinges 24, 27, will be accommodated by the ball-joint 50 turning inside the block 51. It will be seen that even with a large grinding wheel 48, the periphery will run clear of all parts except the cutting tool 30, up to the working depth of the pantograph.

It will be noted that the rocking movement of the dressing tool 30 as the slide 38 oscillates is contrary to that of the stylus 21; this can be allowed for by turning over the template 20 and securing it in a laterally inverted position upon the supporting extension 19, in order to change the hand of the profile on the wheel.

Instead of rocking the dressing tool 30 through the linkage 23 from the stylus 21, the tool may be controlled for its rocking movement by means of a handle mounted coaxially with a pivotal connection of the pantograph mechanism, the stylus being controlled in its bodily movement by a freely rotatable knob or the like, as described in my aforesaid Patent No. 2,691,975.

Referring to Figs. 7 and 8, the lever arm 54, corresponding to the member 11 in my aforesaid Patent No. 2,691,975, is connected at one end by a bearing 55 to the short link 56 of a pantograph mechanism, the other end of the arm being pivoted at 57 to the long link 58 of the mechanism, which carries the stylus (not shown) guided by hand along the template; the lower ends of the two links 56, 58 are connected by a second lever arm 59 in the usual manner, this second arm being pivoted to the short link 56 at the fixed point 60 about which the mechanism is movable. Rocking movement of the stylus and dressing tool may be controlled by a handle 61 upon a bell-crank 62 mounted coaxially with the pivot 57 for operation of a linkage 63, as described in my aforesaid patent.

The lever arm 54 is constructed with a pair of arcuate slides 64 co-operating with another pair of arcuate slides 65 which are connected by a platform 66 to form a carriage for the tool-holder, as seen in Fig. 8. The two pairs of slides 64, 65 are concentric with the rocking axis of the tool 67, this axis being tangential to the periphery of the grinding wheel 68, and they are provided with ball-races 69, also concentric with the rocking axis on opposite sides of the plane of movement of the tool and, arranged to take the radial and axial thrusts; the ball-races are covered by part-annular plates 64a secured to the slides 64.

The tool 67 is mounted upon a block 70, which is shown as being of square section, the tool being secured in position by means of a tool-holder 71; the block 70 is rotatably mounted upon a bearing 72 provided by a bolt passing through a lug 73 projecting upwards from the platform 66 in the middle of the carriage or slides 65, the axis of the bolt or bearing being parallel to the axis of the grinding wheel 68.

Rocking movement of the tool in unison with the stylus is transmitted by the linkage 63 to the carriage or slides 65, by means of a pin 74 engaged in a boss 75 on one side of the carriage, this pin being radially in line with the tool, as seen in Fig. 7.

The upper surface of the lever arm 54 is reduced or cut away, as indicated at 76, adjacent to the arcuate slides, preferably to the level of the top of the block 70, as shown, or to a depth equal to the designed working depth of movement of the pantograph, thus providing a clear passage for a large-diameter wheel; as seen in Fig. 7, the length of the cut-away surface is equal to at least twice the width of the wheel. Figs. 7 and 8 show in chain line part of the circumference of the grinding wheel 68, with the tool 67 penetrating to a depth equal to the maximum movement of the pantograph; it will be seen that the outer periphery of the wheel runs clear of the cut-away portion 76. If the cut-away 76 extends to the level of the top of the block 70, as shown, there will be no limitation to the diameter of the wheel.

The rotatable block 70 may be used to support more than one cutting tool, for example four tools mounted at the respective corners of the square-section block shown, or three tools at the corners of a triangular block; Fig. 8 shows two tools 67, 67a, in opposed relation to the axis of the block, each tool being secured in place by a tool-holder similar to the holder 71; thus the several tools may be operated successively or selectively for cutting the wheel to a desired profile.

What I claim is:

1. Wheel forming means of the character described, comprising a pantograph mechanism, a template support, a stylus connected to said pantograph mechanism and movable bodily and angularly in relation to said template support, a carriage controlled for bodily movement by said pantograph mechanism in response to bodily movement of said stylus, a tool-holder, means for supporting said tool-holder on said carriage, and means for moving said tool-holder angularly in response to angular movement of said stylus, said tool-holder supporting means extending to both sides of the plane of movement of the tool due to angular movement of said tool-holder and being spaced from the axis of said last-mentioned angular movement.

2. Wheel forming means of the character described, comprising a pantograph mechanism, a template support, a stylus connected to said pantograph mechanism and movable bodily and angularly in relation to said template support, a base member adapted for mounting upon a grinding machine, a hinge on said base member, said pantograph mechanism and template support being mounted on said hinge for angular adjustment relative to said base member, relatively rectilinearly movable slides mounted on said base member for movement in planes fixed relatively thereto, and a carriage for a cutting tool to engage a wheel to be formed, said carriage being mounted on said slides and displaceable bodily in a plane fixed relatively to said base member, and means for displacing said carriage in said fixed plane by said pantograph mechanism in response to bodily movement of said stylus, said displacing means being operative irrespective of angular adjustment of said pantograph mechanism relative to said base member.

3. Wheel forming means of the character described, comprising a pantograph mechanism, a template support, a stylus connected to said pantograph mechanism and movable bodily and angularly in relation to said template support, a base member adapted for mounting upon a grinding machine, a hinge on said base member, said pantograph mechanism and template support being mounted on said hinge for angular adjustment relative to said base member, relatively rectilinearly movable slides mounted on said base member for movement in planes fixed relatively thereto, a carriage for a cutting tool to engage a wheel to be formed, means for moving the cutting tool angularly in response to angular movement of said stylus, said carriage being mounted on said slides and displaceable bodily in a plane fixed relatively to said base member, and means for displacing said carriage in said fixed plane by said pantograph mechanism in response to bodily movement of said stylus, said displacing means being operative irrespective of angular adjustment of said pantograph mechanism relative to said base member.

4. Wheel forming means of the character described, comprising a pantograph mechanism, a template support, a stylus connected to said pantograph mechanism and movable bodily and angularly in relation to said template support, a base member adapted for mounting upon a grinding machine, a hinge on said base member, said pantograph mechanism and template support being mounted on said hinge for angular adjustment relative to said base member whereby they may be adjusted to a variable inclination, and two members mounted for relative angular movement, one of said members being displaceable in a fixed plane by said pantograph mechanism in response to movement of said stylus in the plane of said pantograph mechanism even when inclined about said hinge, and a tool-holder secured to the other of said members, the wheel being formed to a modification of the template profile depending upon the variable inclination of said pantograph mechanism.

5. Wheel forming means of the character described, comprising a pantograph mechanism, a template support, a stylus connected to said pantograph mechanism and movable bodily and angularly in relation to said template support, a base member adapted for mounting upon a grinding machine, a hinge on said base member, said pantograph mechanism and template support being mounted on said hinge for angular adjustment relative to said base member whereby they may be adjusted to a variable inclination, two members mounted for relative angular movement, one of said members being displaceable in a fixed plane by said pantograph mechanism in response to movement of said stylus in the plane of said pantograph mechanism when inclined about said hinge, a tool-holder secured to the other of said members, and means for moving said other member angularly for adjusting the tool in response to angular movement of the stylus, the wheel being formed to a modification of the template profile depending upon the inclination of said pantograph mechanism.

6. Wheel forming means of the character described, comprising a pantograph mechanism, a template support, a stylus connected to said pantograph mechanism and movable in relation to said template support, said pantograph mechanism and template support being adjustable to a variable plane of inclination, a tool-holder carriage consisting of two slides arranged to move at right angles to one another in parallel planes, and a coupling member slidable in a direction perpendicular to said parallel planes, one of said slides carrying the tool-holder and including a guide for said slidable coupling member, and said coupling member being displaceable by said pantograph mechanism in response to movement of said stylus in the variable plane of said pantograph mechanism, the movement of said one slide in its own plane being less than the displacement of said coupling member by reason of the inclination of said pantograph mechanism.

7. Wheel forming means of the character described, comprising a pantograph mechanism, a template support, a stylus connected to said pantograph mechanism and movable bodily and angularly in the plane thereof in relation to said template support, a base member adapted for mounting upon a grinding machine, a table hingedly supported upon said base member and adjustable angularly to a variable inclination, said pantograph mechanism being pivotally mounted upon said table for movement in a plane parallel to said table, said template support being rigidly secured to said table, relatively rectilinearly movable slides mounted on said base member for movement in planes fixed relatively thereto, and a carriage for a cutting tool to engage a wheel to be formed, said carriage being mounted on said slides and displaceable bodily in a fixed plane by said pantograph mechanism in response to bodily movement of said stylus irrespective of the inclination of said table, with its actual displacement in said fixed plane depending upon said inclination.

8. Wheel forming means of the character described, comprising a pantograph mechanism, a template support, a stylus connected to said pantograph mechanism and movable bodily and angularly in the plane thereof in relation to said template support, a base member adapted for mounting upon a grinding machine, a table hingedly supported upon said base member and adjustable angularly to a variable inclination, said pantograph mechanism being pivotally mounted upon said table for movement in a plane parallel to said table, said template support being rigidly secured to said table, relatively rectilinearly movable slides mounted on said base member for movement in planes fixed relatively thereto, a carriage for a cutting tool to engage a wheel to be formed, and means for moving said tool angularly upon said carriage in response to angular movement of said stylus, said carriage being mounted on said slides and displaceable bodily in a fixed plane by said pantograph mechanism in response to bodily movement of said stylus irrespective of the variable plane of said pantograph mechanism due to angular adjustment of said table.

9. Wheel forming means of the character described, comprising a pantograph mechanism, a template support, a stylus connected to said pantograph mechanism and movable bodily and angularly in the plane thereof in relation to said template support, a base member adapted for mounting upon a grinding machine, a sub-frame hingedly mounted upon said base member and adjustable angularly to a variable plane of inclination, a table hingedly mounted upon said sub-frame and adjustable angularly to a variable inclination, the hinge-axis of said table relative to said sub-frame being at right angles to the hinge-axis of said sub-frame relative to said base member, said pantograph being pivotally mounted upon said table for movement in a plane parallel to said table, said template support being rigidly secured to said table, relatively rectilinearly movable slides mounted on said base member for movement in planes fixed relatively thereto, and a carriage for a cutting tool to engage a wheel to be formed, said carriage being mounted on said slides and displaceable bodily in a fixed plane by said pantograph mechanism in response to bodily movement of said stylus irrespective of the inclination of said sub-frame and table, with the actual displacement of said carriage in said fixed plane depending upon the variable plane of said pantograph mechanism according to the compounded adjustment of said sub-frame and table relative to said base member.

10. Wheel forming means of the character described, comprising a pantograph mechanism, a template support, a stylus connected to said pantograph mechanism and movable bodily and angularly in the plane thereof in relation to said template support, a base member adapted for mounting upon a grinding machine, a table hingedly supported upon said base member and adjustable angularly to a variable plane of inclination, said pantograph mechanism being pivotally mounted upon said table, said template support being rigidly secured to said table, and two members in part-circular sliding engagement with one another, said members being displaceable together in a fixed plane by said pantograph mechanism in response to movement of said stylus irrespective of the variable plane of said pantograph mechanism due to angular adjustment of said table, a tool-holder secured to one of said members for carrying a cutting tool to engage with a wheel to be formed to a modification of the template profile depending upon the variable plane of said pantograph mechanism according to the inclination of said table, and means for moving said one member angularly in relation to said other member for adjusting said cutting tool in relation to said wheel.

11. A mounting for a dressing tool for profiling the working face of a grinding wheel, comprising a tool-holder carriage controlled for bodily movement by a pantograph mechanism, and means supporting said carriage for rocking movement about an axis tangential to the wheel in response to rocking movement of the pantograph stylus, said carriage-supporting means extending to both sides of the plane of rocking movement of the tool about said axis but being cut away to clear said axis for a length equal to at least twice the bodily movement of the tool along the face of the wheel within the working range of the pantograph mechanism.

References Cited in the file of this patent

UNITED STATES PATENTS

| | | |
|---|---|---|
| 696,950 | Eaton | Apr. 8, 1902 |
| 1,622,527 | Maas | Mar. 29, 1927 |
| 2,197,762 | Johnson | Apr. 23, 1940 |
| 2,303,715 | Alvord | Dec. 1, 1942 |
| 2,434,834 | Civitarese | Jan. 20, 1948 |

FOREIGN PATENTS

| | | |
|---|---|---|
| 623,395 | Great Britain | May 17, 1949 |